(12) United States Patent
Kodish-Wachs

(10) Patent No.: US 11,062,704 B1
(45) Date of Patent: Jul. 13, 2021

(54) PROCESSING MULTI-PARTY CONVERSATIONS

(71) Applicant: CERNER INNOVATION, INC., Kansas City, KS (US)

(72) Inventor: Jodi Kodish-Wachs, Albuquerque, NM (US)

(*) Notice: Subject to any disclaimer, the term of this patent is extended or adjusted under 35 U.S.C. 154(b) by 20 days.

(21) Appl. No.: 16/229,918

(22) Filed: Dec. 21, 2018

(51) Int. Cl.
*G10L 15/22* (2006.01)
*G10L 15/18* (2013.01)
*G10L 21/028* (2013.01)

(52) U.S. Cl.
CPC .......... *G10L 15/22* (2013.01); *G10L 15/1815* (2013.01); *G10L 21/028* (2013.01); *G10L 2015/223* (2013.01)

(58) Field of Classification Search
CPC ... G10L 15/22; G10L 21/028; G10L 15/1815; G10L 2015/223
See application file for complete search history.

(56) References Cited

U.S. PATENT DOCUMENTS

| | | | |
|---|---|---|---|
| 7,881,957 B1 | 2/2011 | Cohen et al. |
| 7,885,811 B2 | 2/2011 | Zimmerman et al. |
| 8,170,897 B1 | 5/2012 | Cohen et al. |
| 8,209,183 B1 | 6/2012 | Patel et al. |
| 8,255,258 B1 | 8/2012 | Cohen et al. |
| 8,374,865 B1 | 2/2013 | Biadsy et al. |
| 8,428,940 B2 | 4/2013 | Kristjansson et al. |
| 8,498,892 B1 | 7/2013 | Cohen et al. |
| 8,612,211 B1 | 12/2013 | Shires et al. |
| 8,694,335 B2 | 4/2014 | Yegnanarayanan |
| 8,700,395 B2 | 4/2014 | Zimmerman et al. |
| 8,738,403 B2 | 5/2014 | Flanagan et al. |
| 8,756,079 B2 | 6/2014 | Yegnanarayanan |
| 8,768,723 B2 | 7/2014 | Montyne et al. |
| 8,788,289 B2 | 7/2014 | Flanagan et al. |
| 8,799,021 B2 | 8/2014 | Flanagan et al. |
| 8,831,957 B2 | 9/2014 | Taubman et al. |
| 8,878,773 B1 | 11/2014 | Bozarth |
| 8,924,211 B2 | 12/2014 | Ganon et al. |

(Continued)

OTHER PUBLICATIONS

Klann et al., "An Intelligent Listening Framework for Capturing Encounter Notes From a Doctor-Patient Dialog", BMC Medical Informatics and Decision Making, vol. 9, (Suppl. 1) S3, 2009, pp. 1-10.

(Continued)

*Primary Examiner* — Stella L. Woo
(74) *Attorney, Agent, or Firm* — Shook, Hardy & Bacon, LLP

(57) ABSTRACT

Embodiments relate to systems and methods that retrieve, from the one or more computer storage memory, dialogue data associated with a plurality of utterances from two or more entities. A target concept in one or more dialogue segments of the transcribed dialogue data can be determined, where the one or more dialogue segments comprising a first dialogue segment associated with a first utterance by a first entity, and where the first dialogue segment includes the target concept. A dialogue goal can be determined for the first dialogue segment comprising the target concept. In addition, a structured link can be generated, associating the extracted concept to the dialogue goal.

20 Claims, 5 Drawing Sheets

(56) References Cited

U.S. PATENT DOCUMENTS

| | | |
|---|---|---|
| 8,953,886 B2 | 2/2015 | King et al. |
| 8,972,243 B1 | 3/2015 | Strom et al. |
| 8,977,555 B2 | 3/2015 | Torok et al. |
| 9,031,926 B2 | 5/2015 | Milward et al. |
| 9,058,805 B2 | 6/2015 | Aleksic et al. |
| 9,117,451 B2 | 8/2015 | Fructuoso et al. |
| 9,129,013 B2 | 9/2015 | Delaney et al. |
| 9,135,571 B2 | 9/2015 | Delaney et al. |
| 9,147,054 B1 | 9/2015 | Beal et al. |
| 9,208,217 B2 | 12/2015 | Milward et al. |
| 9,240,187 B2 | 1/2016 | Torok et al. |
| 9,257,120 B1 | 2/2016 | Alvarez Guevara et al. |
| 9,269,012 B2 | 2/2016 | Fotland |
| 9,292,089 B1 | 3/2016 | Sadek |
| 9,304,736 B1 | 4/2016 | Whiteley et al. |
| 9,318,104 B1 | 4/2016 | Fructuoso et al. |
| 9,324,323 B1 | 4/2016 | Bikel et al. |
| 9,343,062 B2 | 5/2016 | Ganon et al. |
| 9,378,734 B2 | 6/2016 | Ganon et al. |
| 9,384,735 B2 | 7/2016 | White et al. |
| 9,420,227 B1 | 8/2016 | Shires et al. |
| 9,424,840 B1 | 8/2016 | Hart et al. |
| 9,443,509 B2 | 9/2016 | Ganon et al. |
| 9,466,294 B1 | 10/2016 | Tunstall-Pedoe et al. |
| 9,538,005 B1 | 1/2017 | Nguyen et al. |
| 9,542,944 B2 | 1/2017 | Jablokov et al. |
| 9,542,947 B2 | 1/2017 | Schuster et al. |
| 9,552,816 B2 | 1/2017 | VanLund et al. |
| 9,563,955 B1 | 2/2017 | Kamarshi et al. |
| 9,569,594 B2 | 2/2017 | Casella dos Santos |
| 9,570,076 B2 | 2/2017 | Sierawski et al. |
| 9,601,115 B2 | 3/2017 | Chen et al. |
| 9,678,954 B1 | 6/2017 | Cuthbert et al. |
| 9,679,107 B2 | 6/2017 | Cardoza et al. |
| 9,721,570 B1 | 8/2017 | Beal et al. |
| 9,786,281 B1 | 10/2017 | Adams et al. |
| 9,792,914 B2 | 10/2017 | Alvarez Guevara et al. |
| 9,805,315 B1 | 10/2017 | Cohen et al. |
| 9,898,580 B2 | 2/2018 | Flanagan et al. |
| 9,904,768 B2 | 2/2018 | Yegnanarayanan |
| 9,911,418 B2 | 3/2018 | Chi |
| 9,916,420 B2 | 3/2018 | Cardoza et al. |
| 9,922,385 B2 | 3/2018 | Yegnanarayanan |
| 9,971,848 B2 | 5/2018 | D'Souza et al. |
| 10,032,127 B2 | 7/2018 | Habboush et al. |
| 2009/0048833 A1 | 2/2009 | Fritsch et al. |
| 2013/0339030 A1 | 12/2013 | Ehsani et al. |
| 2014/0019128 A1 | 1/2014 | Riskin et al. |
| 2015/0331852 A1* | 11/2015 | Rylov .............. G06F 40/242 704/9 |
| 2015/0340033 A1 | 11/2015 | Di fabbrizio et al. |
| 2017/0329749 A1 | 11/2017 | Milward et al. |
| 2018/0012604 A1 | 1/2018 | Guevara et al. |
| 2018/0240538 A1* | 8/2018 | Koll .............. G16H 15/00 |
| 2019/0065464 A1* | 2/2019 | Finley .............. G06F 40/35 |

OTHER PUBLICATIONS

Rosales et al., "Automated Identification of Medical Concepts and Assertions in Medical Text", AMIA 2010 Symposium Proceedings, 2010, pp. 682-686.

Sibanda et al., "Syntactically-Informed Semantic Category Recognizer for Discharge Summaries", AMIA 2006 Symposium Proceedings, 2006, pp. 714-718.

Zeng et al., "Extracting Principal Diagnosis, Co-Morbidity and Smoking Status for Asthma Research: Evaluation of a Natural Language Processing System", BMC Medical Informatics and Decision Making, vol. 6, No. 30, 2006 pp. 1-9.

\* cited by examiner

422 — Any fevers, chills, sore throat?
Uh, nope, no, just a slight cold, runny nose.
Okay. Do you still have that going on today, or - ?
Uh, I think it's, uh, it's getting better now. Uh, yep, just took some Tylenol and, you know, Cold and Flu, and I think I'm doing okay.
Okay, great. Let me just take a look here and let's review some of the things that we've talked about in the past.
Mm-hmm.
414 — Looks like you're up to date on all your vaccinations and the last time we spoke you weren't a smoker and didn't drink any alcohol has any of that --
Still good on that front. —404d
-- any of that changed?
Nope.
416 — All right, um, and let's see, um, you've been taking the duloxetine and aripiprazole - are you still taking both of those medications for your --
Yes I am, yep I am.
Mm-hmm.
Good, and - and how has the - has the swings been?
Uh, actually it's been good. Yep, I mean I've been pretty uh, been feeling pretty good, so as long as I just stick with it.
Good, good and uh, with that, everything is going well in school you said, grades are doing well and --
Yep can't complain. I could always do better.
All right. Um, all right, well, um, is there anything else new going on - any problems uh, with sleeping or headaches, um, anything with swollen lymph nodes?
Uh, no I think I've been sleeping well. The headaches - well, you know, except for last night, I mean the earache was getting worse but otherwise, you know, generally speaking, I've been sleeping well.
Good.
Yeah.
420 — Chest pain, shortness of breath, cough?
I haven't noticed any of those, no.
Belly pain, nausea, vomiting?
No.
Um, any problems with your bowels or your bladder?
No, I think I've been good there too.
Any weakness, numbness, tingling?
Uh, no, no, and no.
All right, sounds good. Well let's take a look at your ear and your throat and see if we can figure out a little bit about what's going on.
Okay.
All right.

FIG. 4

PROCESSING MULTI-PARTY CONVERSATIONS

Natural language understanding generally relates to the technical field of computer science and artificial intelligence. In particular, natural language understanding addresses the problems of how computers understand human language input and derive meaning therefrom. While traditional natural language processing and automatic speech recognition systems address an initial burden of receiving natural language input, technological problems arise in deriving meaning from language input. This is because significant technical problems arise for computers to understand human natural language input. For example, there are significant technological challenges for a computer to "understand" words in view of broader contexts or circumstances. This ambiguity limits the capabilities of the computer as it may not be able to perform actions including speech recognition, concept recognition, translations, constructing structured databases, and the like, if it cannot understand human language and dialogue data.

In addition, technological problems arise in conventional technology when processing data specific to dialogues or communications between two entities. For example, while challenges exist in parsing individual words in a static natural language context (e.g., an article, book, search query), these challenges are compounded in a dynamic natural language context, such as a multi-entity dialogue (e.g., conversation). Whereas a static natural language context may include receiving input from a single entity or source (e.g., search query, a personal dictation, or an article), the dynamic natural language context may include multiple entities (e.g., conversation between two people). For instance, in a dynamic natural language context, one entity may be interrupted by the other, leading to incomplete statements and thoughts. Additionally, there can be challenges arising from dialogue involving questions and responses because the natural language processor must identify how the content from one entity (e.g., a question) is modified by content provided by another entity (e.g., an answer). In addition, technological problems arise when dialogue data comprises raw, unformatted speech data as there is an increase in ambiguity in conversational speech as opposed to written data that has previously been reviewed and edited.

Further complications arise when dialogue relates to particular knowledge domains (e.g., a biomedical domain). For example, the biomedical domain may rely on complex lexicons, nomenclatures, and terms. The word "cold" may relate to the medical diagnosis of a viral infection of the upper respiratory tract as opposed to the sensation of feeling cold or having chills based on a lower temperature. Whereas humans may naturally infer the meaning of the words, computers must be specifically programed with techniques to derive meaning from natural language. Accordingly, these and other problems introduce technological challenges for computers to perform natural language processing.

In addition, inaccurate natural language processing tools lead to problems in filtering/extracting relevant concepts from multi-entity dialogue data, which may cause an increase in computing resources. For example, because conventional technology has generally failed to provide reliable natural language processing tools to extract the most relevant concepts, the entire dialogue data must be stored. This often results in larger databases and indexes, which is an inefficient use of computer memory resources. Even more, storing entire sets of dialogue data can lead to time-intensive querying. This leads to using greater computer processing resources because the computer must query both the relevant and non-relevant concepts of the dialogue data. As such, it is advantageous to improve the capabilities in natural language.

SUMMARY

Embodiments of the present invention relate to, among other things, natural language processing. Conventional technology has generally failed to provide an adequate or accurate solution in understanding concepts from dialogue data. This is especially true when the dialogue data is based on communications between two entities. As such, the present embodiments are meant to overcome the deficiencies associated with conventional technology.

Aspects of the present technology described below include methods, computer readable media, and systems for natural language processing for overcoming the technical deficiencies of the conventional technology. At a high level, in one aspect, a system for providing natural language understanding of dialogue data is described. The system comprises one or more processors and one or more non-transitory computer storage memory having computer-executable instructions stored thereon that, when executed by the one or more processors, cause the one or more processors to perform the operations of retrieving, from the one or more computer storage memory, dialogue data associated with a plurality of utterances from two or more entities. The operations further comprise determining a target concept in one or more dialogue segments of the transcribed dialogue data, the one or more dialogue segments comprising a first dialogue segment associated with a first utterance by a first entity, the first dialogue segment having the target concept. The operations further comprise determining a dialogue goal for the first dialogue segment comprising the target concept. The operations further comprise generating a structured link associating the extracted concept to the dialogue goal.

In another aspect, a computerized method for providing natural language detection or processing of dialogue data is provided. The method comprises retrieving, from the one or more computer storage memory, dialogue data associated with a plurality of utterances from two or more entities. The method further comprises determining a target concept in one or more dialogue segments of the transcribed dialogue data, the one or more dialogue segments comprising a first dialogue segment associated with a first utterance by a first entity, the first dialogue segment having the target concept. The method further comprises determining a dialogue goal for the first dialogue segment comprising the target concept and generating a structured link associating the target concept to the dialogue goal.

In yet another aspect, one or more non-transitory computer storage memory having computer-executable instructions stored thereon that, when executed by one or more processors, cause the one or more processors to perform a method is provided. The method comprises retrieving, from the one or more computer storage memory, dialogue data associated with a plurality of utterances from two or more entities. The method further comprises determining a first target concept in a first dialogue segment of the dialogue data, the first target concept associated with a first utterance by a first entity. The method further comprises determining a second target concept in a second dialogue segment of the dialogue data, the second target concept associated with a first utterance by a first entity. The method further comprises determining a first extracted concept for the first target concept and determining a second extracted concept based on the second target concept. The method further comprises determining a dialogue goal for the first dialogue segment and the second dialogue segment and generating a structured link associating the first extracted concept and the second extracted concept to the dialogue goal.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments are described in detail below with reference to the attached drawing figures, wherein:

FIG. 4 depicts illustrative dialogue data, in accordance with aspects hereof.

DETAILED DESCRIPTION

Figure 1:
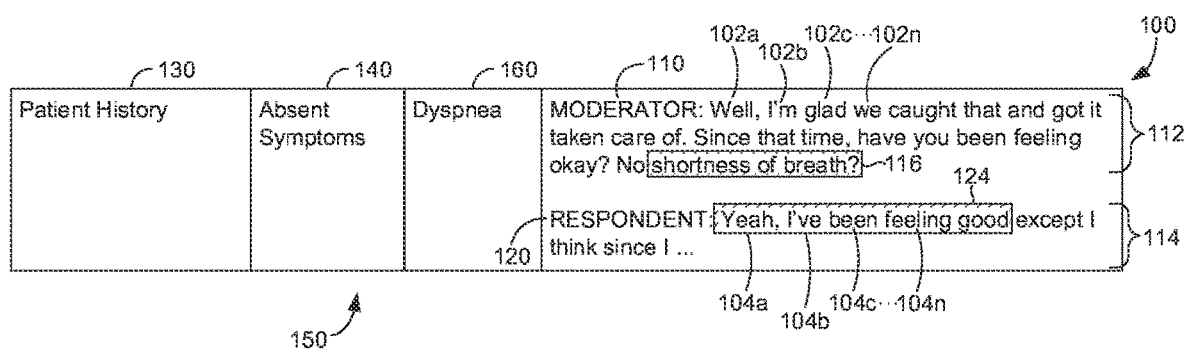
FIG. 1 depicts illustrative dialogue data, in accordance with aspects hereof.

The subject matter herein is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

In the following description, numerous specific details are set forth, such as examples of specific components, devices, methods, and the like, in order to provide a thorough understanding of embodiments of the present disclosure. It will be understood and appreciated, however, by one skilled in the art, that these specific details need not be employed to practice embodiments hereof. In other instances, well-known materials or methods have not been described in detail in order to avoid unnecessarily obscuring embodiments of the present disclosure. While embodiments of the present disclosure are susceptible to various modifications and alternative forms, specific embodiments thereof are shown by way of example in the drawings and will herein be described in detail. It should be understood, however, that there is no intent to limit aspects hereof to the particular forms disclosed, but on the contrary, the intention is to cover all modifications, equivalents, and alternatives falling within the spirit and scope of the invention.

It is to be understood that the present disclosure may be implemented in various forms of hardware, software, firmware, special purpose processors, or a combination thereof. Preferably, embodiments of the present disclosure are implemented in software as a program tangibly embodied on a program storage device. The program may be uploaded to, and executed by, a machine comprising any suitable architecture. Preferably, the machine is implemented on a computer platform having hardware such as one or more central processing units (CPUs), a random access memory (RAM), and input/output (I/O) interface(s). The computer platform also includes an operating system and microinstruction code. The various processes and functions described herein either may be part of the microinstruction code or part of the program (or a combination thereof) which is executed via the operating system. In addition, various other peripheral devices may be connected to the computer platform such as an additional data storage device and a printing device. If written in a programming language conforming to a recognized standard, sequences of instructions designed to implement the methods can be compiled for execution on a variety of hardware platforms and for interface to a variety of operating systems. In addition, embodiments of the present framework are not described with reference to any particular programming language. It will be appreciated that a variety of programming languages may be used to implement embodiments of the present invention.

It is to be further understood that since at least a portion of the constituent system modules and method steps depicted in the accompanying Figures may be implemented in software, the actual connections between the system components (or the flow of the process steps) may differ depending on the manner in which embodiments of the present invention are programmed. Given the teachings herein, one of ordinary skill in the related art will be able to contemplate these and similar implementations or configurations of embodiments of the present invention.

Embodiments of the present invention improve a computer's functioning in the realm of natural language understanding and, more particularly, computational linguistics. As previously set forth in the Introduction, conventional natural language understanding technology has significant drawbacks and is generally not capable of addressing the technological challenges presented by multi-entity dialogue data. Accordingly, embodiments described herein provide a technological solution for enhancing the natural language processing ability of a computing device so it "understands" concepts and utterances by two or more entities. By understanding concepts and utterances, embodiments can eliminate ambiguity in words so as to improve further computing functions, such as speech recognition, querying, storage, translations, and the like. For instance, by linking concepts uttered by one or more entities to a dialogue goal, it can improve the natural language processing capabilities of the computer.

In addition, the technology described herein can provide enhanced natural language processing tools that lead to improvements in conserving computing resources. For example, employing the technology described below, the most relevant concepts may be extracted from multi-entity dialogue data. These extracted concepts can then be stored independent of the entire dialogue data. One advantage is that the entire dialogue data need not be kept on a long-term basis, which can result in larger databases and indexes.

Even more, the technology described herein can enhance querying and/or retrieval times, which reduces computer processing resources. For instance, instead of querying unstructured dialogue datasets, embodiments can reduce computer processing resources and improve query response times by querying a structured data set that represents the dialogue data. For example, the computer can query a structured data set of the relevant concepts and dialogue goals as opposed to the entire dialogue data. Additionally, as opposed to retrieving the entire dialogue data set, computing devices can retrieve the extracted concepts and the dialogue goals only. In addition to improved retrieval times and conserving computing resources, this may also improve human consumption of the dialogue data. In other words, because the enhanced natural language understanding techniques described herein link concepts to dialogue goals, it prevents the time-intensive task of users having to manually review entire dialogue data sets.

The present disclosure generally provides methods, computer-readable media, and systems to address these technological challenges. At a high level, the present disclosure relates to detecting and utilizing dialogue goals to enhance natural language processing. A dialogue may comprise a plurality of utterances having a target concept, speaker goals, and dialogue topics. Dialogue topics can represent an implicit subject or abstraction of the dialogue segments. Speaker goals can relate to the speaker's motivation for the utterance (e.g., an entity's intent). Structured links can then be created between utterances, target concepts, speaker goals, and dialogue topics across dialogue segments. This document uses the term dialogue goal to represent either the dialogue topic or the speaker's goal in relation to the dialogue topic, or a combination thereof. For instance, in a medical conversation context, a dialogue topic may relate to a medical history, symptoms, absent symptoms, medication intervention, etc., while a speaker's goal may be to seek information (e.g., a question) or an affirmative statement (e.g., a response to a question).

Dialogues may be captured and stored in the form of dialogue data in computer memory. A dialogue generally refers to a communication between two or more entities. The dialogue data may comprise one or more dialogue segments comprising a plurality of utterances. In general, the term utterance can represent a word(s) communicated by an entity to another entity. Each dialogue segment can be associated with an entity and may comprise a target concept. Embodiments can determine the target concept within the dialogue segment. In one embodiment, an extracted concept is also determined based on the target concept using a semantic scheme. In addition, embodiments can determine a dialogue goal. Each of the target concepts and the extracted concepts can be linked to the dialogue goal. By linking the concepts to the dialogue goal, structured dialogue data can be generated. Accordingly, embodiments offer an enhanced natural language processor that is an improvement over conventional technology. It should be appreciated that the term natural language processing encompasses a natural language processor (NLP), automatic speech recognition (ASR), and natural language understanding.

As mentioned, dialogue data generally refers to any type of data capturing a communication between two or more entities. The dialogue data can be stored in any digital form, including media data (audio, video, and the like) and text data. In one embodiment, the dialogue data may be from a variety of sources. For instance, dialogue data may comprise unformatted, raw audio signals that are captured by one or more input devices, such as a microphone. In one embodiment, dialogue data comprises unformatted, raw data that is captured from an electronic chat forum/environment. The dialogue data may then be stored in computer storage memory for further processing and retrieval.

As mentioned, dialogue data can refer to a communication between two or more entities. The dynamic nature of a dialogue presents challenges for computing processing as it introduces complexity into processing the data and how the computer interprets and assigns meaning to the content, as discussed above. As used here, the term dynamic dialogue generally refers to how each entity's utterance(s) and participation may depend on the other entity's utterance(s) and participation. As such, the term dynamic dialogue does not necessary mean that the content is constantly changing after it has been stored. Though, in some embodiments, the content of dialogue data (e.g., one or more utterances by an entity) may change as it can be tagged, manipulated, structured, or modified through computer natural language processes.

In one embodiment, the dialogue data comprises a plurality of utterances between two or more entities. An entity can be interpreted broadly, as the term can refer to a person, a machine, or the like. For instance, an entity may be a conversational interface (e.g., a "chat bot"). Additionally, in one aspect, the entity may have a particular role in relation to the second entity. By way of example, in a healthcare setting, a first entity may be a care provider and the second entity may be a patient. It should be appreciated that the utterances can be stored in association with a particular speaker role, such as a caregiver, a provider, a patient, patient's legal guardian, patient caregiver and the like.

Each of the plurality of entities may communicate with the other through an utterance. Each utterance can be a communication through any means, including written, oral, sign language, signals, and the like. As mentioned, the utterance can be recorded and stored as dialogue data for further processing. In one aspect, the plurality of utterances are spoken by at least two entities and then stored as dialogue data.

In embodiments, the dialogue data is stored as raw, unformatted data. For example, the dialogue data can be stored after it is recorded by one or more input devices, such as a microphone, a video camera, keyboard, and the like, without being processed by a natural language processor. In further embodiments, the dialogue data is formatted data that is generated based on initial processing of an unformatted dialogue data by a natural language processor. For instance, the unformatted dialogue data can be processed using a natural language processor engine to create a formatted dialogue data set, such as a transcription of the dialogue data. In other words, dialogue data may be parsed to extract semantic and/or syntactic content from the dialogue data to create a formatted output data (e.g., a transcription). The transcription of the dialogue data can then be stored and retrieved. It is contemplated that, in other embodiments, the dialogue data is transcribed manually.

In one embodiment, the dialogue data comprises one or more dialogue segments. The one or more dialogue segments may comprise an utterance in the form of a word, a group of words, phrases, sentences, numbers, dates, sentences, and the like. Additionally, each of the one or more dialogue segments may be associated with a particular entity. Accordingly, in one embodiment, a first dialogue segment may be associated with a first utterance by the first entity and a second dialogue segment may be associated with a second utterance from a second entity.

In another embodiment, the one or more dialogue segments may be parsed to identify a target concept. The target concept may be an utterance that is communicated by one entity to another entity. In aspects, the target concept can be determined based on a weighting scheme that identifies utterances or words that should be linked to a particular dialogue goal. As such, embodiments can distinguish between utterances that are more relevant to the dialogue goal than those that are less relevant. In general, the utterances or words that facilitate determining a particular dialogue goal can be predetermined using predictive modeling (e.g., machined learned model). Additionally, the weighting scheme can be any rule, logic, condition, prediction, pattern inference algorithm, machine learned model, and the like, that is capable of determining which concept (if any) within the dialogue segment should be a target concept and, thus, linked to a particular dialogue goal. For instance, the weighting scheme may comprise fuzzy logic, neural network, finite state machine, support vector machine, logistic regression, clustering, machine learning techniques, similar statistical classification processes, or combinations of these to determine that a concept from one or more dialogue segments should be a target concept. Additionally, the weighting scheme may rely on circumstances surrounding the dialogue, pre-identified concepts, and terms relevant to one or more knowledge domains (or relevant to lexicons in that knowledge domain) to determine which utterances should be classified as a target concept. By way of example only, a weighting algorithm may be used to weight the relevancy of the concepts, such as a term frequency-inverse document frequency (TF-IDF) algorithm.

Additionally, the utterance can be more heavily weighted if it is associated with a structured semantic data source or lexicon related to particular fields of endeavor, such as the biomedical field, engineering field, computer science field, and the like. In aspects that relate to the medical domain, predetermined medical terminology (e.g., a SNOMED concept) or non-medical terminology, or a combination thereof, may be used to identify a target concept. Additionally, the natural language processor can rely on predictive modeling or heuristics to identify target concept or disambiguate the true semantic meaning of the target concept. For example, an utterance of "well" has various semantic meanings in the following statements: "I am feeling well;" "Well, um, I feel bad;" "I got water from the well." In some embodiments, natural language processing rules and statistical models can determine the semantic meaning.

For example, referring to FIG. 1, a first dialogue segment 112 may comprise "Well, I'm glad that we caught that and got it taken care of. Since that time, have you been feeling okay? No shortness of breath?" The utterance "shortness of breath" can be weighted higher based on its relevancy to a particular knowledge domain (e.g., medical symptoms) and, thus, qualify as one or more target concepts. Utterances using stop words that do not convey any meaning (a, the, and, or, etc.) may not be labeled as a target concept and, potentially, filtered. It should be appreciated that while utterances may not be labeled as a target concept, they may still be used for other purposes (e.g., to determine a dialogue goal). For instance, the first dialogue segment 112 may comprise the utterances, "Since that time, have you been feeling okay?" These utterances may be used for determine the dialogue goal of Patient Symptoms to which the target concept (shortness of breath) may eventually be linked. As discussed below, identifying a target concept may allow for extracting the more relevant concepts related to a dialogue goal. While there are many advantages, one advantage is that identifying target concepts conserves computing resources, such as the computer's processing power and storage space. This is because the more relevant concepts can be processed and stored in a structured format.

An extracted concept can be generated based on the target concept. The extracted concept may be the same term or a different term than the target concept. In one embodiment, the target concept is processed through a natural language processor to generate an extracted concept that is semantically related to the target concept. Said differently, the target concept may be correlated to the extracted concept via a semantic scheme. The semantic scheme may utilize a natural language model or a structured data source, such as a knowledge base, or a combination thereof. By way of example, the natural language model may rely on fuzzy logic, neural network, finite state machine, support vector machine, logistic regression, clustering, machine learning techniques, similar statistical classification processes, or combinations of these. The structured data source may include associative and hierarchical relationships of terms, nomenclatures, concepts, etc. In a biomedical context, a biomedical structured data source can be used, such as the Unified Medical Language System (UMLS), Logical Observation Identifiers Names and Codes (LOINC), or Systematized Nomenclature of Medicine (SNOMED). Accordingly, in one aspect, the semantic scheme may be specific to a knowledge domain, such as a biomedical semantic scheme. It is contemplated that the target concept or the extracted concept can then be stored in a structured data format.

In some embodiments, the natural language processor can determine a dialogue goal from the dialogue data. A dialogue goal generally refers to either the dialogue topic or the speaker's goal in relation to the dialogue topic, or a combination thereof. Additionally, the dialogue goal may define an objective or reason for the utterance in the context of a multi-entity dialogue. In other words, the dialogue goal provides the underlying purpose for the communication between two or more entities. Accordingly, a single dialogue goal can encompass one or more dialogue segments. Additionally, the dialogue goal may not be specific to any single entity as it may encompass utterances from a plurality of entities. In an exemplary aspect, a single dialogue goal can encompass the first dialogue segment associated with an utterance by a first entity and a second dialogue segment associated with an utterance by a second entity. Alternatively, utterances from a plurality of entities may have a plurality of dialogue goals. In one embodiment, the target concept and extracted concept can be linked to a dialogue goal.

The dialogue goal can be determined based on analyzing the dialogue data. For example, in some embodiments, the natural language processor can determine a dialogue goal based on identifying predetermined key words or phrases. In a biomedical context, the natural language processor may rely on both medical terminology and non-medical terminology to determine a dialogue goal. Medical terminology generally refers to terms or concepts that are particularly relevant in the biomedical field. For example, medical terminology can relate to a particular medical concept that is identified in one or more biomedical structured data sources, such Unified Medical Language System (UMLS), Logical Observation Identifiers Names and Codes (LOINC), or Systematized Nomenclature of Medicine (SNOMED). As such, in some embodiments, the natural language processor may rely on both medical terminology and non-medical terminology to determine a dialogue goal.

By way of example, a natural processor can determine a dialogue goal with respect to an exemplary utterance of "I am taking Lisinopril." The natural language processor can identify the term Lisinopril (which is a term associated with a medical concept) to determine that the entity's dialogue goal relates to a medication. The natural language processor can further identify the predefined key word or phrase of "I am taking" to determine that the entity's dialogue goal indicates that the entity is communicating that the medication is a current medication. As such, the natural language processor can determine that the utterance "I am taking Lisinopril" is associated with a dialogue goal of Current Medication. As explained in more detail below, the utterance (and any target concepts or extracted concepts) of Lisinopril can then be stored in a structured database in association with the dialogue goal of Current Medication.

In some embodiments, the natural language processor can determine a dialogue goal based on determining the temporality of the utterance. The natural language processor can determine whether the utterance relates to a past, present, or future. In some aspects, the natural language can rely on grammatical structure and rules to determine whether the utterance relates to the past, present, or future temporality. For example, a natural language processor may analyze the utterance "I had a headache" to determine a dialogue goal. The natural language processor can determine that the utterance is associated with a symptom (e.g., headache) and has a past temporality. As such, the natural language processor can determine that the utterance "I had a headache" is associated with a dialogue goal of Past Symptoms.

It should be appreciated that as described herein, determining the dialogue goal can allow for quicker processing and retrieval of the utterance. As explained in more detail below, the utterance can be stored in association with the dialogue goal via a structured dialogue data set. In addition, critical terms (e.g., a target concept) can be extracted from the dialogue data and stored in association with the dialogue goal.

In some embodiments, the dialogue goal can be determined based on attributes associated with each utterance. An attribute can include a plurality of factors including the semantic meaning of an utterance, a context of the utterance with respect to other utterances within a particular dialogue segment, the context of the utterance with respect other dialogue segments, an identity or role of the speaker, an entity's role in relation to a another entity, an entity's intent, a grammatical state of the utterance, a context of the particular dialogue segment with respect to other dialogue segments, a context of a particular utterance with respect to the entire dialogue, and the like.

As discussed above, communications between two or more entities may be dynamic. As part of the dynamic context, communications between two or more entities may address a plurality of dialogue goals throughout the plurality of dialogue segments. In one embodiment, the dialogue data may comprise isolated dialogue segments that refer to the same dialogue goal. Said differently, even though dialogue segments may be separated by one or more intervening dialogue segments, the isolated dialogue segments may be associated with the same dialogue goal. As such, in aspects, a first dialogue goal may encompass two or more dialogue segments that are non-sequential or non-continuous (e.g., separated by dialogue segments that are associated with a second dialogue goal), which is discussed in greater detail in reference to FIG. 4.

In some embodiments, the natural language processor can determine whether an utterance is complete or incomplete. An utterance can be incomplete based on an entity being interrupted by another entity or based on the entity's communication being undecipherable (e.g., the entity's voice is in audible). Because communications between two or more entities can be dynamic, one entity may interject or respond before the other entity's utterance is completed. In some aspects, the natural language processor can determine whether an utterance is complete or incomplete based on analyzing the grammatical structure of the utterance. In addition, the natural language processor can determine whether an utterance is complete based on detecting that one entity interjected or cut off the other entity. For instance, the natural language processor can determine that there is an abrupt change in the dialogue based on a change in vocal tone or pitch. In addition, the natural language processor can detect a portion of the utterance is undecipherable and therefore incomplete. In some embodiments, the natural language processor can determine a dialogue goal for the utterance despite whether the utterance is complete or incomplete. In other words, the dialogue goal does not depend on a complete utterance. Employing the techniques described herein, the natural language processor can still determine a dialogue goal for an incomplete utterance.

Additionally, dialogue goals may be specific to a particular knowledge domain. In one embodiment, the dialogue goal may be specific to a biomedical knowledge domain. Additionally, dialogue goals may be attuned for the biomedical knowledge domain. In addition, dialogue goals may be attuned for specific communications, such as a conversation between a health care provider and a patient. In one embodiment, dialogue goals may comprise a reason for a patient inquiry or visit, patient history, symptoms (past, present and absent), duration of the symptoms, medications (past, present, future), outcomes of past medications, a clinical condition that is suspected, recommended medications, or actions for the clinical condition discussed. These goals may provide further context, allowing the computer to "understand" or interpret the concepts within the dialogue data. This is because the dialogue goal can provide a mutual objective for the communication between multiple entities.

In one embodiment, a single dialogue segment (and/or target concept) may relate to a plurality of dialogue goals. For example, in a biomedical dialogue context, a single dialogue segment can relate to the dialogue goal of Patient History and the dialogue goal of Absent Symptoms. It should be appreciated that Absent Symptoms may itself be a goal or may be a qualified goal. For instance, the qualified goal of Absent Symptom can represent the goal of Symptoms, which is qualified as being absent. It should be appreciated that Absent Symptoms may relate to information provided by an entity indicating that he or she has not experienced the symptom. Alternatively, Absent Symptoms may represent a lack of information, where the patient has not indicated whether or not she has experienced the symptom. Referring to FIG. 1, the single dialogue segment 112 "Well, I'm glad we caught that and got it taken care of. Since that time, have you been feeling okay? No shortness of breath?" may be associated with the dialogue goals of Patient History 130 and Absent Symptoms 140.

As used herein, the term dialogue goal is often used in context of describing the dialogue topic. It should be appreciated though that the term dialogue goal may further be associated the speaker's goal in relation to the dialogue topic. The speaker's goal generally relates to the purpose behind the speaker's utterance as determined by the natural language processor since the computer must rely on the natural language processor to determine a speaker's motivation. In some aspects, the speaker's goal may be associated with the purpose of seeking information. As such, for example, dialogue segment 112 may be associated with the speaker goal of seeking information about the dialogue topics Patient History 130 and Absent Symptoms 140. Accordingly, each word within the utterance (such as a target concept) can be linked to both the dialogue topic and the speaker's goal.

Continuing, the natural language processor can determine that the speaker's goal provide information in response to another entity's utterance. In other words, the speaker's goal may be associated with providing information sought by another entity. For example, dialogue segment 114 "Yeah, I've been feeling good except I think since I . . . " can be in response to the moderator's goal of seeking information in dialogue segment 112. As such, dialogue segment 114 may be associated with the speaker goal of providing information. Additionally, it is contemplated that the speaker's goal can be associated with a purpose to confirm or clarify information.

In some embodiments, the speaker's goal can be determined based on identifying words or phrases within the utterance. In some aspects, natural language processing models are used to identify the words or phrases associated with the speaker's goals to provide context for the dialogue segment. By way of example only, words or phrases including "have you," "are you," "did you," or "can you" can be utilized to identify a speaker's motivation to seek information. Additionally, the words yes or no may be associated with a speaker's goals of providing information in response to another entity's inquiry. In some embodiments, the first speaker's goals can be used to identify a second speaker's goals. Continuing with the example above, the words or phrase "have you" may be analyzed in context with a second speaker's utterance of "yeah" to detect a second speaker's goal of responding to the first speaker's question. As such, dialogue segment 114 may be associated with a responsive speaker goal. By identifying particular speaker goals, computers can store words within the utterance with a structured link to the determined speaker goal. This can allow for more efficient storage and retrieval (both in time and computing resources) of the utterances within a structured database.

In some aspects, a natural language processor can rely on predictive modeling or heuristics to identify words or phrases associated with particular speaker goals. Exemplary natural language processors may rely on fuzzy logic, a neural network, a finite state machine, a support vector machine, a logistic regression, clustering, machine learning techniques, statistical classification processes, or combinations of these to identify words or phrases that allow the computer to identify words or phrases uttered by the entities so as to determine the speaker's goal associated with the utterance. In some embodiments, the natural language processor identifies a speaker goal based on analyzing the context of each utterance with respect to other utterances or in context with the dialogue as a whole. In addition, the speaker goal can be determined based on the attribute of each utterance.

In various embodiments, the dialogue goals may be organized in a hierarchical structure. For instance, a primary dialogue goal may have a plurality of secondary dialogue goals. In one embodiment, the primary dialogue goal of Diagnosis may include a second dialogue goal of Relevant Symptoms. For instance, a target concept of "Lisinopril" may be linked to a primary dialogue goal of Medication Intervention. The target concept of "Lisinopril" may further be linked to a secondary dialogue goal such as "Effective" or "Ineffective." The plurality of dialogue goals allow the computer to understand and process the dialogue data.

In various embodiments, the dialogue goal can be determined through predictive modeling or heuristics. For example, a machine learned model may determine the dialogue goal based on a key word or phrase from one or more dialogue segments, a temporal order for one or more dialogue segments, or identifying the entity associated with each of the one or more dialogue segments. It should be appreciated that the dialogue goal can be determined based natural language processing models, such as models that rely on fuzzy logic, neural networks, finite state machines, support vector machines, logistic regressions, clustering, machine learning techniques, statistical classification processes, or combinations of these.

As a further example, the dialogue goal can be determined based on the context of the utterance. For example, the natural language processor can determine the dialogue goal for a particular utterance based on the context of the utterance with respect to other utterances of a particular dialogue segment, the context of a particular identity or role of the speaker attributed to the utterance, a speaker's role in relation to a second entity, the speaker's intent, grammatical state of the utterance, the context of the particular dialogue segment with respect to other dialogue segments, and the like. Additionally, the context of each utterance can be analyzed with respect to the entire dialogue data. Said differently, each utterance can be analyzed based on the context of the utterance within the dialogue as a whole.

In some embodiments, the dialogue goal can be determined with respect to the state of any prior or subsequent dialogue goals. In some embodiments, machine-learned models determine the state of the dialogue goal for an utterance based on its surrounding dialogue goals. As dialogue data may comprise a plurality of dialogue goals, the dialogue may be separated into separate dialogue goal states. These dialogue goal states may follow particular pattern in series of dialogue goals. In some aspects, such as those within the medical domain, dialogue states may follow a predictable pattern. Various embodiments can utilize these state patterns to determine the target dialogue goal. In other words, a particular series of dialogue goals may be utilized to identify the target dialogue goal for a particular utterance. For example, if dialogue data captures a dialogue between a care provider and a patient, the dialogue may follow a predictable pattern of states, including a greeting, a medical history, a reason for a visit, information for current symptoms, and a care provider's diagnosis. Accordingly, the state of a prior or subsequent dialogue goal can be used in determining the target dialogue goal for the particular utterance.

In various embodiments, the dialogue goal can be determined based on attributes of each utterance. Among other things, attributes can include a speaker name, a speaker role (e.g., a caregiver, a provider, a patient, patient's legal guardian, patient caregiver), an utterance subject, a particular dialogue segment for a particular utterance, a grammatical state for the utterance, biomedical clinically relevant terms, key words and phrases (e.g., "clue words"), an extracted concept, a purpose of visit (e.g., social courtesy, history, clinical examination, clinical planning, interruption, and clinical procedure), a speaker goal (e.g., to seek, give, confirm, or clarify), a dialogue goal (e.g., a speaker goal or a dialogue topic), a widget, or a widget value. The utterance and any attribute associated therewith can then be stored and linked with the dialogue goal in a structured dialogue data set. In some embodiments, predictive modeling or heuristics can be used to determine the attributes associated with the utterance. By way of example, embodiments can rely on fuzzy logic, neural network, finite state machine, support vector machine, logistic regression, clustering, machine learning techniques, similar statistical classification processes, or combinations of these to determine an attribute of the utterance.

It should be appreciated that identifying a target concept and determining a semantic understanding of the concept may not adequately provide a context for an utterance. If the target concept is semantically understood as "asthma," conventional NLP technology generally fails to determine a dialogue goal to provide a dialogue context for the concept of asthma. It should be appreciated that by employing the techniques described herein, NLP technology can be enhanced so as to determine if an entity is asking another entity if they have asthma or if there is a family history of asthma, for example. Even more, by employing the techniques described herein, NLP technology can be enhanced so as to determine whether there was a recommendation to treat asthma even though a patient did not communicate having the condition, for example.

By way of example reference is now made to FIGS. 1-5 that illustrate exemplary embodiments described herein. While the figures may depict dialogue data as being in text format, this is for illustrative purposes only. It is contemplated that the dialogue data may be in any format (e.g., raw audio data) suitable for use with the invention described herein.

FIG. 1 illustrates exemplary dialogue data set 100 comprising one or more utterances. As shown, the dialogue data set also comprises a plurality of dialogue topics (or, more generally, dialogue goals). For instance, the dialogue data set comprises a Patient History 130, Symptom Dyspnea 160, and Absent Symptoms 140. The one or more utterances may comprise a first plurality of words 102*a-n* communicated by a first entity, Moderator 110, and a second plurality of words 104*a-n* communicated by a second entity, Respondent 120. The dialogue data set 100 further comprises one or more dialogue segments, including a first dialogue segment 112 and a second dialogue segment 114. As illustrated, the first plurality of words 102*a-n* can define the first dialogue segment 112, while the second plurality of words 104*a-n* can define the second dialogue segment 114. In one embodiment, a natural language processor may parse the first dialogue segment 112 and determine a target concept, e.g., "shortness of breath" 116. An extracted concept 160 can then be generated based on the target concept 116. The extracted concept may be the target concept itself, a concept that is semantically related to the target concept, or both. For example, the extracted concept may be "chest pain" which is the same as a target concept of "chest pain." Additionally, the extracted concept may be "dyspnea" which is semantically related to the target concept of "shortness of breath." As such, in one embodiment, the extracted concept can be generated from the target concept utilizing a semantic scheme. As shown, the extracted concept may be a biomedical extracted concept of "dyspnea" 160. Although the extracted concept is shown as being a different term than the target concept, it is contemplated that the semantic scheme may generate the same term as the target concept. This may occur when the extracted concept is the same term as the target concept in one or more lexicons. For example, if the target concept of "chest pain" (not shown) would be the same as an extracted concept of "chest pain." As shown, the extracted concept may be linked to one or more dialogue goals, such as a Patient History 130 and Symptoms 140, which may be a qualified goal of Absent Symptom. As discussed above, Absent Symptoms may itself be a dialogue goal. Alternatively, it may be a qualified goal such that the dialogue goal is Symptom, but is qualified as being absent. In either aspect, the term absent symptoms may represent a goal of soliciting a positive indication from another entity that a particular symptom is absent.

In one embodiment, the plurality of utterances by the second entity in a second dialogue segment may be parsed as a value that modifies a target concept associated with a first dialogue segment. With continued reference to FIG. 1, the plurality of words 104*a-n* communicated by the second entity Respondent 120 in a second dialogue segment 114 may be parsed to determine that the value(s) 124 ("Yeah, I've been feeling good") modifies the target concept 116 from a first dialogue segment 112. For example, the value may confirm, validate, negate, deny, qualify, or quantify the target concept. As shown, in response to the first entity asking whether the second entity has not had any of shortness of breath, the second entity responds with "Yeah, I've been feeling good." Structured data can then be generated by linking the extracted concept 160 of Dyspnea from one utterance to the first dialogue goal of patient history 130 and the qualifier of the extracted concept from another utterance.

As illustrated, embodiments can generate a structured dialogue data set 150 that is based on filtering the dialogue data 100. For instance, lower weighted dialogue terms can be filtered while the target concepts are extracted. Once generated, the structured dialogue data set 150 may be stored or used for a number of purposes, including a doctor's note or a patient's record. The structured dialogue data set may also be used for the automation of further tasks. By way of example only, embodiments may automatically order a prescription if it is determined that a particular medication was discussed in relation to a dialogue goal of Medication Being Prescribed. Because embodiments resolve ambiguity in the meaning utterances or words, they enable the computer to perform any and all tasks based on the utterance.

As mentioned above, the dialogue goal may encompass two or more dialogue segments from a plurality of entities. As shown in FIG. 1, the dialogue goals 130, 140 may encompass the first dialogue segment 112 and the second dialogue segment 114. Accordingly, embodiments can determine that the utterances or words within those two or more dialogue segments (either by a single entity or by different entities) relate to the same dialogue goal.

Figure 2:
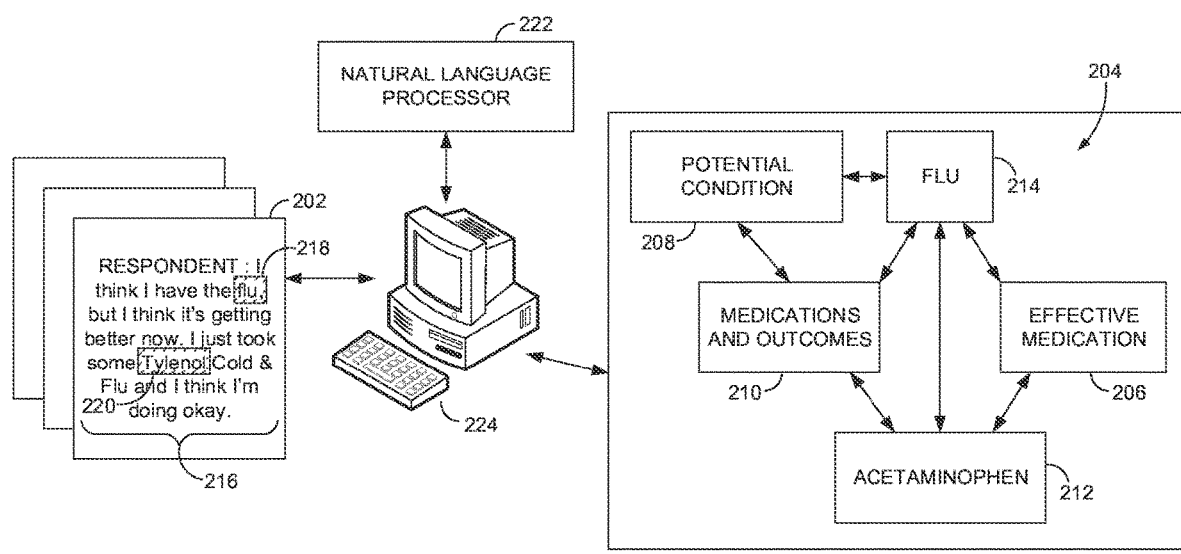
FIG. 2 depicts illustrative dialogue data, in accordance with aspects hereof.

Turning now to FIG. 2, in one aspect, embodiments retrieve dialogue data 202 from computer readable memory and generate structured dialogue data 204. In general, structured dialogue data refers to a structured data model that links concepts associated with the dialogue data with the dialogue goal and any other attributes of the utterance. Any structured dialogue data model can be used to generate a link between one or more of an utterance and attributes of the utterance, such as a target concept, an extracted concept, a dialogue goal, a speaker role, a particular dialogue segment, or any combination thereof. As used herein, the term structured link may refer to any association of the terms or concepts described herein that is stored in computer memory. For example, a structured link may be generated by associating the target concept with a dialogue goal (the dialogue topic, the speaker goal, or both). As a further example, a structured link may be generated by associating the utterance with an extracted concept and the dialogue goal (the dialogue topic, the speaker goal, or both). It should be appreciated that an utterance, a target concept, an extracted concept, and a dialogue goal are only examples of the data that can be linked within the structured dialogue data. Generally, any and all utterances and attributes thereof can be linked to the dialogue goal. For example, a structured link can be generated that associates attributes of an utterance. The attributes can provide further context for the utterance beyond the dialogue goal. As such, an attribute can include plurality of factors in addition to the semantic meaning of an utterance. The attributes of the utterance can include a data source for the unstructured dialogue data, a timestamp for the utterance (e.g., a start-stop time of the utterance), a speaker name, a speaker role, an utterance subject, a particular dialogue segment for a particular utterance, a grammatical state for the utterance, biomedical clinically relevant terms, key words and phrases (e.g., "clue words"), an extracted concept, a purpose of visit (e.g., social courtesy, history, clinical examination, clinical planning, interruption, and clinical procedure) a speaker goal (e.g., to seek, give, confirm, or clarify), a dialogue goal (e.g., a speaker goal or a dialogue topic), a widget, or a widget value. It should be appreciated that the structured dialogue data may also include undiscovered concepts within the dialogue data.

The structured data model can be fully-structured or semi-structured. For instance, the structured dialogue data 204 may be generated utilizing a fully-structured data model, such as a relational model database (e.g., SQL Database). Additionally, the structured dialogue data 204 can be generated from a semi-structured data model, such as a non-relational model (e.g., NoSQL Database). For instance, the semi-structured data model can be a Key-value store, Graph store, Column store, and Document store. It is contemplated herein that the structured dialogue data 204 may be stored using any database model, such as a hierarchical database model, network model, relational model, entity relationship model, object model, document model, semantic model, graph model, and/or the like. One advantage of generating the structured dialogue data is that computing resources can be conserved in storing, querying, or further processing of the dialogue data. For example, computer storage can be conserved as the dialogue data can be filtered and stored as structured dialogue data, reducing the amount of data that should be stored by filtering out dialogue data that is not associated with a dialogue goal. In one embodiment, the structured dialogue data may be stored in a file associated with one of the plurality of entities. In one aspect, one of the entities is a patient and the structured dialogue may be stored in a file associated with the patient, such as a patient health record. An exemplary patient health record includes electronic medical record ("EMR"), electronic health record (EHR), health information exchange ("HIE"), personal health record ("PHR"), patient claim, and other health record databases. Additionally, the dialogue data may be stored as notes in a health care provider's record.

Further advantages include that the structured dialogue data is consumable by the computer for subsequent autonomous computer operations. In one aspect, the structured dialogue data may be used in speech recognition applications. For instance, when a particular dialogue goal is recognized, it may trigger a computing device to perform an operation that would normally require human intervention and input. In other words, human intervention can be avoided based on generating structured, machine-consumable dialogue data. As such, based on the technology and techniques described herein, a computing device can act autonomously without human intervention, thereby improving the functioning of the computer. In one embodiment, a computing device may autonomously order a prescription based on understanding that one of the entities has prescribed a particular medication.

Still referring to FIG. 2, the dialogue data 202 may comprise one or more concepts within dialogue segment 216. For example, the dialogue data 202 may comprise a first target concept "Flu" 218 and a second target concept "Tylenol Cold & Flu" 220. These target concepts can be identified by a natural language processor 222 associated with a computing device 224. As illustrated, structured dialogue data 204 can be generated from the dialogue data 202 through a computing device 224 (such as the computing device 500 of FIG. 5). The structured dialogue data 204 can capture relationships between one or more dialogue goals and the target concept. For example, the dialogue goal "Potential Condition" 208 may be linked to the extracted concept of "Flu" 214. In addition, the structured dialogue data may capture the association of a second dialogue goal "Medications and Outcomes" 210 and the extracted concept of "Acetaminophen" 212. In embodiments, the structured dialogue data may be generated based on filtering the target concepts from the remaining utterances or words. For example, a structured dialogue data may be generated and recorded in a doctor's note indicating that the patient suspects they have the Flu. Accordingly, one or more utterances within the dialogue segments may be filtered, such as the utterances or words of "think," "have," "just," "took," etc.

In another embodiment, the structured dialogue data 204 is generated based on tagging (also referred to as linking) the target concept of the dialogue data with the dialogue goal without filtering the other utterances within dialogue segments. In some embodiments, structured dialogue data may be generated by creating metadata for the dialogue data and any identified target concepts contained therein. Take, for example, the dialogue data 202 "I think I have the flu, but I think it's getting better now. I just took some Tylenol Cold & Flu and I think I'm doing okay." Structured dialogue data can be generated by associating metadata with the dialogue data 202, where the metadata comprises one or more dialogue goals. For example, the metadata for the dialogue data 202 may comprise dialogue goals of Potential Condition 208 and Medications and Outcomes 210. Additionally, the metadata for the dialogue data 202 may identify the word "Flu" as a target concept that is linked to the dialogue goal of Potential Condition 208. As a further example, the metadata comprise the extracted concept Acetaminophen 212. By linking target concepts and extracted concepts to a dialogue goal, embodiments can generate a structured dialogue data set based on the dialogue data. As such, embodiments can generate a structured dialogue data set that can capture the relationship between each utterance and the one or more dialogue goals. As described herein, the structured dialogue data set can capture the relationship between attributes of each utterance and the dialogue goal. The structured dialogue data set can be advantageous as it can provide a context for the semantic meaning of the utterance. Among other things, the structured dialogue data set can improve the functioning of the computer as it can generate structured dialogue data that is consumable by a computing device to perform autonomous tasks.

Figure 3:
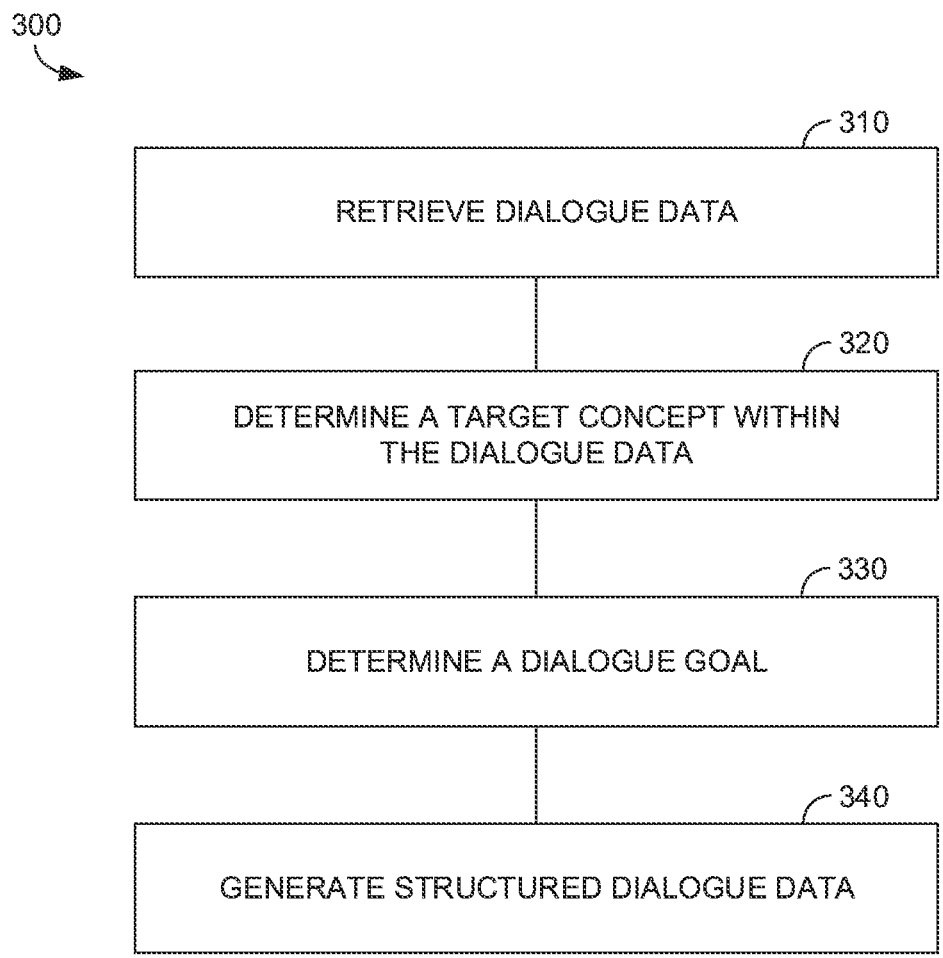
FIG. 3 depicts a flow diagram of an exemplary method for generating structured dialogue data.

Turning now to FIG. 3, a method 300 of generating structured data from dialogue data is illustrated according to embodiments herein. In step 310 the dialogue data is retrieved from memory of the computing device. The dialogue data may be generated by the computing device or received from another computing device and stored. In one embodiment, utterances by two or more entities are captured by an input device and stored. For example, the utterances may be captured through an input device and stored in a data store (or computer data memory). The data store may be embodied as one or more data stores or may be in the cloud. The dialogue data may be stored in raw, unformatted data or formatted data (e.g., a transcription).

At step 320, a target concept within the dialogue data is determined or identified. In one embodiment, the target concept is associated with dialogue segments from a plurality of entities. For example, a first dialogue segment can be attributed to a first entity and a second dialogue segment can be attributed to a second entity. Each of the first and second dialogue segments may comprise utterances by either the first and second entity, respectively.

Still referring to step 320, the one or more dialogue segments can be parsed. As described above, the dialogue segments may be parsed using a natural language processor. The target concepts may be determined using a natural language processor associated with a computing device (such as computing device 500). In one embodiment, the natural language processor is a machined learned model trained to identify the target concept. In one aspect, the machined learned model may use a term-weighting scheme, where terms that are relevant to a particular knowledge domain (e.g., a biomedical knowledge domain) can be weighted higher than stop words, words not related to the particular knowledge domain, and the like. Additionally, a value within a second dialogue segment of audio data can be determined. The value may modify the target concept. For instance, the value may confirm, validate, negate, deny, qualify, or quantify the target concept.

At step 330, a dialogue goal for the one or more dialogue segments is determined. The dialogue goal can be determined based on natural language processing or machine learned models. For example, the machine learned model may determine the dialogue goal based on a key word or phrase from one or more dialogue segments, a temporal order for one or more dialogue segments, or identifying the entity associated with each of the one or more dialogue segments. As a further example, the attributes of each utterance can be analyzed to determine a dialogue goal. As described herein, an attribute can include plurality of factors in addition to the semantic meaning of an utterance. For example, an attribute of the utterance can include its context with respect to other utterances within a particular dialogue segment, the identity or role of the speaker, a speaker's role in relation to a second entity, the speaker's intent, grammatical state of the utterance, the context of the particular dialogue segment with respect to other dialogue segments, and the like. It should be appreciated that the dialogue goal can be determined based on an enhanced natural language processor employing the techniques described herein. As described herein, in some embodiments, fuzzy logic, neural network, finite state machine, support vector machine, logistic regression, clustering, machine learning techniques, similar statistical classification processes, or combinations can be relied upon to determine the dialogue goal.

At step 340, structured dialogue data may be generated from the dialogue data. In one embodiment, the structured dialogue data comprises an association between the target concept and the dialogue goal. For instance, the association may be a structured link. In one embodiment, an extracted concept may be determined from the target concept using a semantic scheme. As such, the target concept and the extracted concept can be linked to the dialogue goal using a structured data model.

Referring now to FIG. 4, dialogue data 400 having non-sequential dialogue segments associated with a single dialogue goal is illustrated in accordance with aspects herein. As shown, the dialogue data 400 may have at least a first dialogue segment 422, a second dialogue segment 414, a third dialogue segment 416, and a fourth dialogue segment 420. As mentioned above, the dialogue segments may be non-sequential (also referred to as non-continuous). For example, the second dialogue segment 414 and the third dialogue segment 416 may be intervening dialogue segments that separate the first dialogue segment 422 from the fourth dialogue segment 420. Despite the intervening dialogue segments (i.e., the first dialogue segment 422 and the fourth dialogue segment 420) target concepts determined from the first dialogue segment 422 and the fourth dialogue segment 420 can be linked to a single dialogue goal, as discussed below.

In an exemplary aspect, a first dialogue goal of Absent Symptoms can be determined for the first dialogue segment 422. This can be based on a machined learned model. In one instance, the machine learned model may rely on key words to identify the dialogue goal, such as the key words of "fevers" 402*a*, "chills" 402*b*, "sore throat" 402*c*, "Do you still have that going on today?" 402*d*, and "no" 402*e*. In exemplary aspects, the key words to determine the dialogue goal can be associated with the first dialogue segment 422 and any surrounding dialogue segments. As illustrated, in one aspect, it is determined that the first dialogue goal may be Absent Symptoms. It may also be determined that the key words, e.g., "sore throat" 402*c*, is a target concept. A structured link can then be generated, linking the target concept of "sore throat" 402*c* to the dialogue goal of Absent Symptoms.

Still referring to FIG. 4, the intervening dialogue segments (e.g., the second dialogue segment 414 and the third dialogue segment 416) may relate to a dialogue goal that is different from the first dialogue goal. For example, embodiments may link the second dialogue segment 414 to a second dialogue goal of Patient History. Determining the dialogue goal can be based on the key words/phrases, such as "you're up to date" 404*a*, "vaccinations" 404*b*, "last time we spoke" 404*c*, "smoker" 404*d*, "alcohol" 404*e*, and "any of that changed" 404*f*. Additionally, embodiments can link the third dialogue segment 416 to a third dialogue goal of Current Medications. In an exemplary aspect, this can be based on key words/phrases identified in the third dialogue segment and any surrounding dialogue segments, such as the key words "you've" 410*a*, "been" 410*b*, "taking" 410*c*, "duloxetine" 410*d* and "aripiprazole" 410*e*.

Though separated by intervening dialogue segments having different dialogue goals, target concepts associated with the fourth dialogue segment 420 can be linked to the first dialogue goal of Absent Symptoms. For instance, embodiments can determine that the key word "cough" 418*a* is a target concept. In addition, it can be determined whether any values modify the target concept, such as the word "no" 418*b*. In other words, embodiments can determine that there is a negation of the target concept. Accordingly, when the target concept is a condition, the negation may indicate a lack or absence of the condition. A structured link can then be generated between the target concept of "cough" 418*a* in the fourth dialogue segment 420 and the first dialogue goal of Absent Symptoms. As such, embodiments can link target concepts from isolated dialogue segments to the same dialogue goal. The model may be trained to identify a presence and negation of a concept, keyword, phrase, etc. There is no need to identify the actual word or concept identified and negated. Rather, the model is trained to identify negation of a concept within the context of a conversation.

Figure 5:
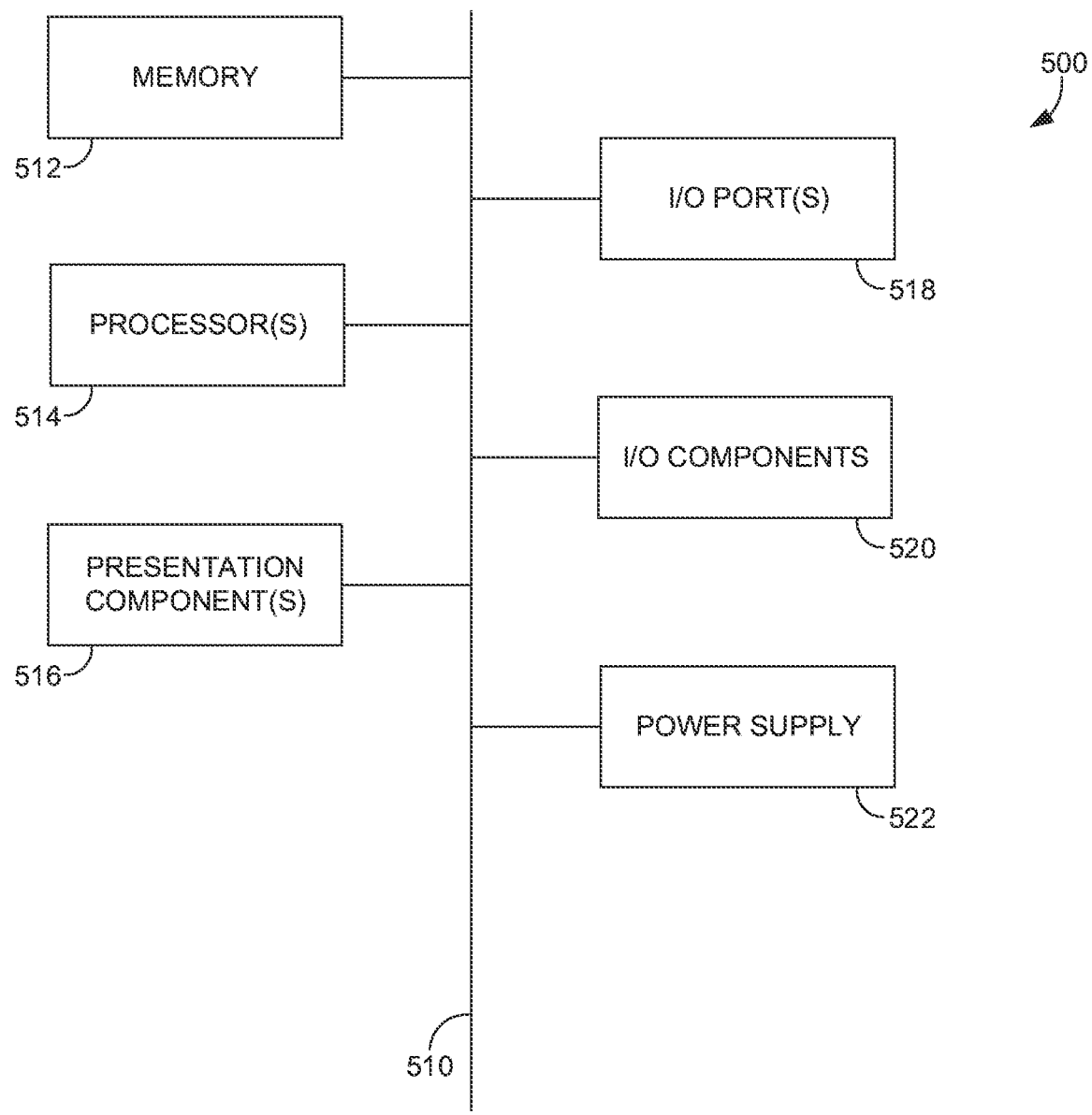
FIG. 5 depicts an exemplary operating environment, in accordance with aspects hereof.

Having described implementations of the present disclosure, an exemplary operating environment in which embodiments of the present invention may be implemented is described below in order to provide a general context for various aspects of the present disclosure. Referring to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld devices. Generally, program modules including routines, programs, objects, components, data structures, etc., refer to code that performs particular tasks or implements particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 516, input/output (I/O) ports 518, input/output components 520, and illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A system for providing natural language detection or processing (NLP) of dialogue data, comprising:
  one or more processors;
  one or more computer storage memory having computer-executable instructions stored thereon that, when executed by the one or more processors, cause the one or more processors to perform operations comprising:
    retrieve, from the one or more computer storage memory, dialogue data associated with a plurality of utterances from two or more entities;
    determine a target concept in one or more dialogue segments of the dialogue data to extract, the one or more dialogue segments comprising a first dialogue segment associated with a first utterance by a first entity, the first dialogue segment having the target concept, and wherein the target concept is determined to be within the first utterance within the one or more dialogue segments, and wherein the target concept is determined by weighting each of the one or more dialogue segments relative to one another according to a weighting scheme that increases weight based on increasing relevancy to a knowledge domain;

determine a dialogue goal for the first dialogue segment comprising the target concept; and generate a structured link associating the target concept extracted from the first dialogue segment to the dialogue goal.

2. The system of claim 1, wherein the one or more dialogue segments comprises a second dialogue segment that is associated with a second utterance which is associated with a second entity, and wherein the target concept is determined based on filtering stop words within the first utterance and the second utterance.

3. The system of claim 2, wherein the computer-executable instructions further cause the one or more processors to: determine a value within the second dialogue segment of the dialogue data, the value modifying the target concept.

4. The system of claim 2, wherein the dialogue goal encompasses the first dialogue segment associated with the first utterance by the first entity and the second dialogue segment associated with the second utterance of the second entity.

5. The system of claim 4, wherein the first dialogue segment and the second dialogue segment are non-sequential.

6. The system of claim 1, wherein an extracted concept is determined using a biomedical semantic scheme.

7. The system of claim 6, wherein the computer-executable instructions further cause the one or more processors to: update a file of a patient with the extracted concept and the dialogue goal.

8. The system of claim 1, wherein determining the dialogue goal comprises at least one of: determining a keyword from the one or more dialogue segments, determining a temporal order for the one or more dialogue segments, and identifying the first entity associated with each of the one or more dialogue segments.

9. The system of claim 1, wherein each of the plurality of utterances from the two or more entities is associated with a speaker role, wherein the speaker role is at least one of a caregiver, a patient, a provider, or a legal guardian of the patient.

10. The system of claim 1, wherein the structured link is based on a structured dialogue database employing a structured data model.

11. The system of claim 9, wherein the weighting scheme uses a term frequency-inverse document frequency algorithm.

12. The system of claim 1, wherein the computer-executable instructions further cause the one or more processors to: generate, via a natural language processor, a transcription of dialogue data based on raw audio data captured by one or more sensors.

13. The system of claim 1, wherein the dialogue goal comprises both an intent of a speaker and a dialogue topic.

14. A computerized method for providing natural language detection or processing (NLP) of dialogue data, comprising:

retrieving, from one or more computer storage memory, dialogue data associated with a plurality of utterances from two or more entities;

determining a target concept in one or more dialogue segments of the dialogue data, the one or more dialogue segments comprising a first dialogue segment associated with a first utterance by a first entity, the first dialogue segment having the target concept, and wherein the target concept is determined to be within the first utterance within the one or more dialogue segments, and wherein the target concept is determined by weighting each of the one or more dialogue segments relative to one another according to a weighting scheme that increases weight based on increasing relevancy to a knowledge domain;

determining a dialogue goal for the first dialogue segment comprising the target concept; and generating a structured link associating the target concept to the dialogue goal.

15. The method of claim 14, wherein the one or more dialogue segments comprises a second dialogue segment that is associated with a second utterance which is associated with a second entity.

16. The method of claim 15, wherein the dialogue goal encompasses the first dialogue segment associated with the first utterance by the first entity and the second dialogue segment associated with the second utterance of the second entity.

17. The method of claim 16, wherein the first dialogue segment and the second dialogue segment are non-sequential.

18. The method of claim 14, wherein the method further comprises updating a file of a patient with an extracted concept and the dialogue goal.

19. The method of claim 14, wherein the structured link is based on a structured dialogue database employing a structured data model.

20. One or more non-transitory computer storage memory having computer-executable instructions stored thereon that, when executed by one or more processors, cause the one or more processors to perform a method comprising:

retrieving, from the one or more computer storage memory, dialogue data associated with a plurality of utterances from two or more entities;

determining a first target concept in a first dialogue segment of the dialogue data, the first target concept associated with a first utterance by a first entity wherein the first target concept is determined by weighting the first dialogue segment relative to a different dialogue segment according to a weighting scheme that increases weight based on increasing relevancy to a knowledge domain;

determining a second target concept in a second dialogue segment of the dialogue data, the second target concept associated with the first utterance by the first entity;

determining a first extracted concept for the first target concept;

determining a second extracted concept based on the second target concept;

determining a dialogue goal for the first dialogue segment and the second dialogue segment; and generating a structured link associating the first extracted concept and the second extracted concept to the dialogue goal.

* * * * *

UNITED STATES PATENT AND TRADEMARK OFFICE
CERTIFICATE OF CORRECTION

PATENT NO. : 11,062,704 B1
APPLICATION NO. : 16/229918
DATED : July 13, 2021
INVENTOR(S) : Jodi Kodish-Wachs Page 1 of 1

It is certified that error appears in the above-identified patent and that said Letters Patent is hereby corrected as shown below:

In the Specification

Column 07, Line 17-32: Delete "Additionally, the utterance can be more heavily weighted if it is associated with a structured semantic data source or lexicon related to particular fields of endeavor, such as the biomedical field, engineering field, computer science field, and the like. In aspects that relate to the medical domain, predetermined medical terminology (e.g., a SNOMED concept) or non-medical terminology, or a combination thereof, may be used to identify a target concept. Additionally, the natural language processor can rely on predictive modeling or heuristics to identify target concept or disambiguate the true semantic meaning of the target concept. For example, an utterance of "well" has various semantic meanings in the following statements: "I am feeling well;" "Well, um, I feel bad;" "I got water from the well." In some embodiments, natural language processing rules and statistical models can determine the semantic meaning." and insert the same on Column 7, Line 16 as a continuation of the same paragraph.

In the Claims

Column 21, Line 14: In Claim 2, delete "utterance" and insert -- utterance, --,

Column 22, Line 20: In Claim 15, delete "utterance" and insert -- utterance, --, Column 22, Line 46: In Claim 20, delete "entity" and insert -- entity, --.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*